(12) United States Patent
Grebenev

(10) Patent No.: US 7,861,236 B2
(45) Date of Patent: Dec. 28, 2010

(54) SYSTEM AND METHOD FOR VERSION CONTROL FOR SOFTWARE DEVELOPMENT

(75) Inventor: Dmitry Grebenev, East Setauket, NY (US)

(73) Assignee: Computer Associates Think, Inc., Islandia, NY (US)

(*) Notice: Subject to any disclaimer, the term of this patent is extended or adjusted under 35 U.S.C. 154(b) by 1477 days.

(21) Appl. No.: 11/130,781

(22) Filed: May 17, 2005

(65) Prior Publication Data

US 2005/0262486 A1    Nov. 24, 2005

Related U.S. Application Data

(60) Provisional application No. 60/572,554, filed on May 19, 2004.

(51) Int. Cl.
*G06F 9/44* (2006.01)
*G06F 9/45* (2006.01)

(52) U.S. Cl. ............... 717/142; 717/120; 717/122; 717/153

(58) Field of Classification Search ......... 717/120–123, 717/153, 140, 162, 106
See application file for complete search history.

(56) References Cited

U.S. PATENT DOCUMENTS 4,916,610 A * 4/1990 Bapat ................ 717/141
6,769,115 B1 * 7/2004 Oldman ................ 717/126

(Continued)

FOREIGN PATENT DOCUMENTS

WO    WO 9963431 A2 * 12/1999

OTHER PUBLICATIONS

BSD General Commands Manual, 4.3 Berkeley Distribution, Apr. 1, 1994, 2 pgs.*

(Continued)

*Primary Examiner*—Lewis A Bullock, Jr.
*Assistant Examiner*—Carina Yun
(74) *Attorney, Agent, or Firm*—Baker Botts L.L.P.

(57) ABSTRACT

A method for constructing a software distribution image includes modifying zero or more to-be-compiled components of the software distribution image using pre-processing instructions to delineate modifications for inclusion or exclusion from a final compiled version of the to-be-compiled components. Modifying one or more not-to-be-compiled components of the software distribution image using pre-processing instructions to delineate modifications for inclusion or exclusion from a final ready-to-run version of the not-to-be compiled components. Preprocessing each of the zero or more to-be-compiled components to either include or exclude each of the delineated modifications of the to-be-compiled components based on desired characteristics of the software distribution image. Preprocessing each of the one or more not-to-be-compiled components to either include or exclude each of the delineated modifications of the not-to-be-compiled components based on the desired characteristics of the software distribution image to obtain a ready-to-run version of each of the one or more not-to-be-compiled components. Compiling each of the zero or more preprocessed to-be-compiled components to obtain a compiled version of each of the zero or more to-be-compiled components. Assembling each of the one or more ready-to-run components and each of the zero or more compiled components into the software distribution image.

33 Claims, 4 Drawing Sheets

U.S. PATENT DOCUMENTS

| | | | | |
|---|---|---|---|---|
| 7,296,199 | B1 * | 11/2007 | Nugent et al. | 714/724 |
| 2002/0083421 | A1 * | 6/2002 | Simons | 717/140 |
| 2003/0163801 | A1 * | 8/2003 | Thames et al. | 717/123 |

OTHER PUBLICATIONS

Notification of Transmittal of the International Search Report for Application No. PCT/US2005/017466; 7 pages, Dec. 23, 2005.

Written Opinion of the International Searching Authority for Application No. PCT/US2005/017466; 6 pages, Dec. 23, 2005.

XP-002354639; GNU Make; Richard M. Stallman and Roland McGrath; 161 pages, Apr. 2000.

XP-002354648; Open Source Library; Ant Das Java Build-Tool in der Praxis; Bernd Matzke; Addison-Wesley; 145 pages, Dec. 2003.

XP-000722017; Configuration Management—Keeping it all Together; S.M. Thompson; BT Technol J vol. 15, No. 3; 13 pages, Jul. 1997.

XP-000294534; Software Engineering Journal; The Evolution of Configuration Management and Version Control; Vincenzo Ambriola, et al.; pp. 303-310, Nov. 1990.

* cited by examiner

Fig. 3

| | |
|---|---|
| Initial Version:<br>Source Code Deliverable<br>------------------------------------<br><br>#include <stdio.h><br><br>int main(){<br>    printf("hello!\n");<br>}<br><br>311 | Initial Version:<br>Startup Script<br>---------------------------<br><br>#!/bin/sh<br>./hello<br><br><br><br><br>321 |
| After Change Version:<br>Source Code Deliverable<br>------------------------------------<br><br>#include <stdio.h><br><br>int main(int ac,char*av[]){<br>    printf("hello,%s\n",av[1]);<br>}<br><br>312 | After Change Version:<br>Startup Script<br>---------------------------<br><br>#!/bin/sh<br>./hello $USER<br><br><br><br><br>322 |
| Present Disclosure:<br>Source Code Deliverable<br>------------------------------------<br><br>#include <stdio.h><br><br>int main(int ac,char*av[]){<br>#ifdef CHANGE1<br>    printf("hello,%s\n",av[1]);<br>#else<br>    printf("hello!\n");<br>#endif /* CHANGE */<br>}<br>313 | Present Disclosure:<br>Startup Script<br>---------------------------<br><br>#!/bin/sh<br>#ifdef CHANGE1<br>./hello $USER<br>#else<br>./hello<br>#endif /* CHANGE1 */<br><br><br>323 |

SYSTEM AND METHOD FOR VERSION CONTROL FOR SOFTWARE DEVELOPMENT

REFERENCE TO RELATED APPLICATION

The present application is based on and claims the benefit of provisional application Ser. No. 60/572,554, filed May 19, 2004, the entire contents of which are herein incorporated by reference.

BACKGROUND

1. Technical Field

The present disclosure relates to software development and, more specifically, to a system and method for version control for software development.

2. Description of the Related Art

Software development processes routinely utilize programmers working on medium to large projects to concentrate on a particular area of software development according to their specialization (e.g. different people may be modifying documentation and programming language code). Even if the same programmer modifies several files, temporal inconsistencies in the code repository may exist until the modified files are checked in. In the software production environment, these individual pieces of software are often referred to as "deliverables." When all deliverables have been developed, they may be integrated into a distribution image. The distribution image may include all of the compiled code and related files, such as for example scripts, configuration files, man pages, etc. that come together to form the finished software package. The distribution image may then be distributed to customers and/or sent to a quality assurance (QA) team to verify that the distribution image functions properly.

However, because deliverables undergo frequent modification and/or update, ensuring complete compatibility amongst deliverables is a constant challenge. Because deliverables may have multiple interdependencies, changes to one deliverable may necessitate subsequent changes to one or more of the other deliverables to settle the interdependencies.

As each deliverable may undergo frequent revision, matching up the correct versions of deliverables represents a perpetual challenge to software developers. A distribution with one or more mismatched deliverables may be inoperable or may function unpredictably. Such a distribution may be called a broken distribution image. Broken distribution images may be categorized as an inconsistent build, for example where a recently added feature is missing from one or more deliverables, or for example where an old discontinued deliverable is still present in the distribution image, etc.

Software developers therefore invest substantial time and effort in resolving inconsistent builds and/or in meeting accepted quality standards, for example ISO 9001 compliant development processes. QA departments may be required to direct many scarce resources towards the very time-consuming and tedious task of resolving inconsistent builds. It is therefore desirable to utilize a system and method for automatically ensuring operative builds.

Presently available techniques for ensuring operative builds may be used to ensure that compiled deliverables are properly matched. For example, ifdef-based preprocessing controls may be used to allow particular features of deliverables to lie dormant within source code and either be included or excluded from the compiled object code depending on whether the particular features are compatible with the current build. In this way it is ensured that each compiled deliverable is compatible with the current build.

However, software packages are not limited to compiled deliverables. Many non-compiled deliverables such as, for example, scripts, XML, HTML, documents, multi-media files, and the like, are used alone and/or in conjunction with compiled deliverables to form a distribution image. These non-compiled deliverables may also share interdependency with each other and/or compiled deliverables.

Without some kind of arrangement that excludes work-in-progress files from participating in a build, a build may have to be postponed until some future time when all changes are in. One possible arrangement is to keep backups of files made before modifications have started and using them for builds while their copies are being updated. However, this solution is rather cumbersome and is otherwise disadvantageous.

It is therefore desirable to utilize a system and method for ensuring the operability of distribution images that may include compiled and/or non-compiled deliverables.

SUMMARY

A method for constructing a software distribution image includes modifying zero or more to-be-compiled components of the software distribution image using pre-processing instructions to delineate modifications for inclusion or exclusion from a final compiled version of the to-be-compiled components. Modifying one or more not-to-be-compiled components of the software distribution image using pre-processing instructions to delineate modifications for inclusion or exclusion from a final ready-to-run version of the not-to-be compiled components. Preprocessing each of the zero or more to-be-compiled components to either include or exclude each of the delineated modifications of the to-be-compiled components based on desired characteristics of the software distribution image. Preprocessing each of the one or more not-to-be-compiled components to either include or exclude each of the delineated modifications of the not-to-be-compiled components based on the desired characteristics of the software distribution image to obtain a ready-to-run version of each of the one or more not-to-be-compiled components. Compiling each of the zero or more preprocessed to-be-compiled components to obtain a compiled version of each of the zero or more to-be-compiled components. Assembling each of the one or more ready-to-run components and each of the zero or more compiled components into the software distribution image.

A system for constructing a software distribution image includes an editor for modifying zero or more to-be-compiled components of the software distribution image using pre-processing instructions to delineate modifications for inclusion or exclusion from a final compiled version of the to-be-compiled components. An editor for modifying one or more not-to-be-compiled components of the software distribution image using pre-processing instructions to delineate modifications for inclusion or exclusion from a final ready-to-run version of the not-to-be compiled components. A pre-processing unit for preprocessing each of the zero or more to-be-compiled components to either include or exclude each of the delineated modifications of the to-be-compiled components based on desired characteristics of the software distribution image. A helper script for preprocessing each of the one or more not-to-be-compiled components to either include or exclude each of the delineated modifications of the not-to-be-compiled components based on the desired characteristics of the software distribution image to obtain a ready-to-run version of each of the one or more not-to-be-compiled components. A compiler for compiling each of the zero or more preprocessed to-be-compiled components to obtain a compiled version of each of the zero or more to-be-compiled components. A distribution builder for assembling each of the one or more ready-to-run components and each of the zero or more compiled components into the software distribution image.

A computer system includes a processor and a computer recording medium including computer executable code executable by the processor for constructing a software distribution image. The computer executable code includes code for modifying zero or more to-be-compiled components of the software distribution image using pre-processing instructions to delineate modifications for inclusion or exclusion from a final compiled version of the to-be-compiled components. Code for modifying one or more not-to-be-compiled components of the software distribution image using pre-processing instructions to delineate modifications for inclusion or exclusion from a final ready-to-run version of the not-to-be compiled components. Code for preprocessing each of the zero or more to-be-compiled components to either include or exclude each of the delineated modifications of the to-be-compiled components based on desired characteristics of the software distribution image. Code for preprocessing each of the one or more not-to-be-compiled components to either include or exclude each of the delineated modifications of the not-to-be-compiled components based on the desired characteristics of the software distribution image to obtain a ready-to-run version of each of the one or more not-to-be-compiled components. Code for compiling each of the zero or more preprocessed to-be-compiled components to obtain a compiled version of each of the zero or more to-be-compiled components. Code for assembling each of the one or more ready-to-run components and each of the zero or more compiled components into the software distribution image.

A computer recording medium including computer executable code for constructing a software distribution image. The computer executable code includes code for modifying zero or more to-be-compiled components of the software distribution image using pre-processing instructions to delineate modifications for inclusion or exclusion from a final compiled version of the to-be-compiled components. Code for modifying one or more not-to-be-compiled components of the software distribution image using pre-processing instructions to delineate modifications for inclusion or exclusion from a final ready-to-run version of the not-to-be compiled components. Code for preprocessing each of the zero or more to-be-compiled components to either include or exclude each of the delineated modifications of the to-be-compiled components based on desired characteristics of the software distribution image. Code for preprocessing each of the one or more not-to-be-compiled components to either include or exclude each of the delineated modifications of the not-to-be-compiled components based on the desired characteristics of the software distribution image to obtain a ready-to-run version of each of the one or more not-to-be-compiled components. Code for compiling each of the zero or more preprocessed to-be-compiled components to obtain a compiled version of each of the zero or more to-be-compiled components. Code for assembling each of the one or more ready-to-run components and each of the zero or more compiled components into the software distribution image.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is an example of a simple C program and an accompanying startup script represented in multiple forms to illustrate an embodiment of the present disclosure.

DETAILED DESCRIPTION

Figure 1:
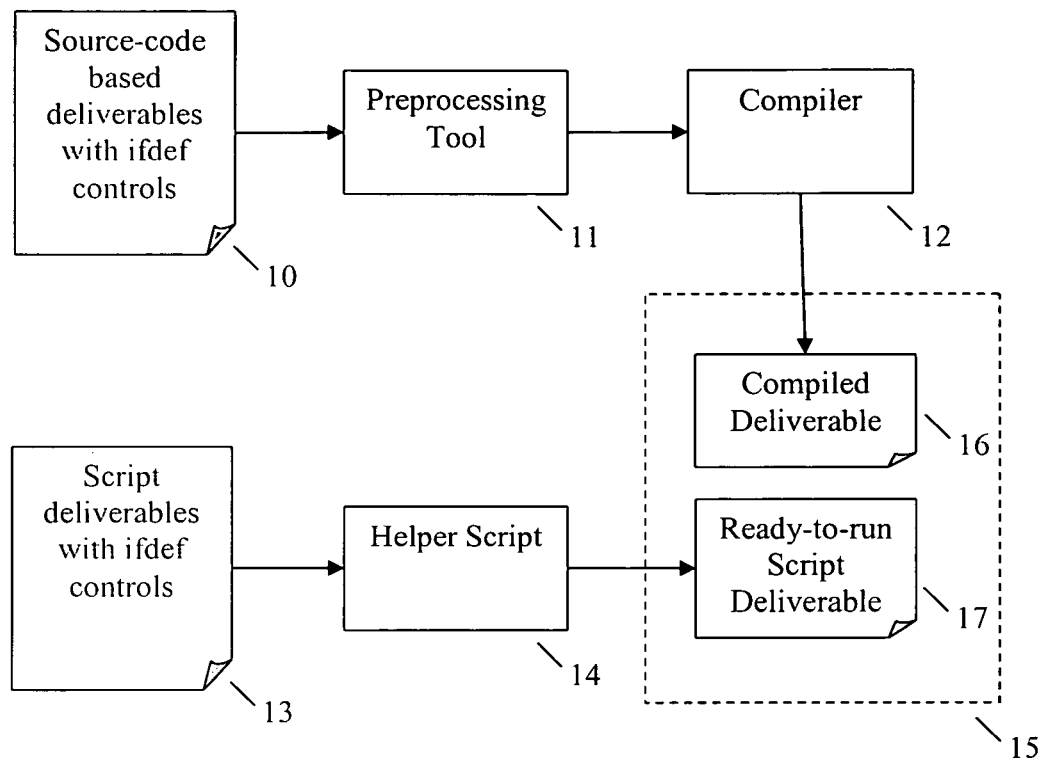
FIG. 1 is a block diagram showing a system for maintaining version control in software development according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to ensure the operability of distribution images that may include compiled and/or non-compiled deliverables. For example, embodiments of the present disclosure may provide for the automatic synchronization of to-be-compiled deliverables and not-to-be-compiled deliverables, for example scripts such as, for example, scripts used to call compiled deliverables.

In embodiments of the present disclosure, controls may be inserted into not-to-be-compiled deliverables, for example a script file as if the script where source code. For example, standard ifdef-based preprocessing controls may be inserted into the script file to delineate features that may be added or removed depending on the features that are present in the final build. For example a file editor, for example a text editor, may be used to insert the preprocessing controls into the script file. An example of ifdef-based pre-processing controls may be found in implementations of the C programming language. A tool, for example, a macro, may then be used to process the script file to produce a finalized deliverable that is compatible with the final distribution. For example, the tool may be a macro that is also used to perform the ifdef-based preprocessing controls that have been incorporated into the source code of the compiled deliverables. For example, the tool may be a helper script that is used to produce a ready-to-run deliverable version of the ifdef'ed script.

Similarly, the same controls may be inserted into to-be-compiled deliverables, for example C code source files. An editor may be used to implement and add these controls. A pre-processing unit may later be used to preprocess the source code to execute the ifdef-based preprocessing controls on the source code. The pre-processing unit may be, for example, a unifdef tool or preprocessing functionality of a compiler.

It is not necessary to use ifdef-based preprocessing controls to practice embodiments of the present disclosure. Any convention used to selectively include or exclude features of deliverables from a finalized deliverable may be used. However, according to an embodiment of the present disclosure, the same convention is applied to deliverables that are to be compiled as is applied to deliverables that are not to be compiled.

FIG. 1 is a block diagram showing a system for maintaining version control in software development according to an embodiment of the present disclosure. Source-code based to-be-compiled deliverables designed to include ifdef controls 10 may be sent to a pre-processing tool 11. The pre-processing tool 11 may resolve the ifdef controls based on the characteristics of the current build. The preprocessed source-code based deliverables may then be sent to a compiler 12. The compiler may compile the source-based deliverables into compiled binary deliverables 16. The compiled deliverables 16 may then be incorporated into the distribution image of the current build 15.

Not-to-be-compiled deliverables, for example script deliverables, designed to include ifdef controls 13 may be sent to a helper script 14. The helper script 14 may resolve the ifdef controls based on the characteristics of the current build to produce a ready-to-run script deliverable 17. The ready-to-run script deliverable may be integrated into the distribution image of the current build 15.

Figure 2:
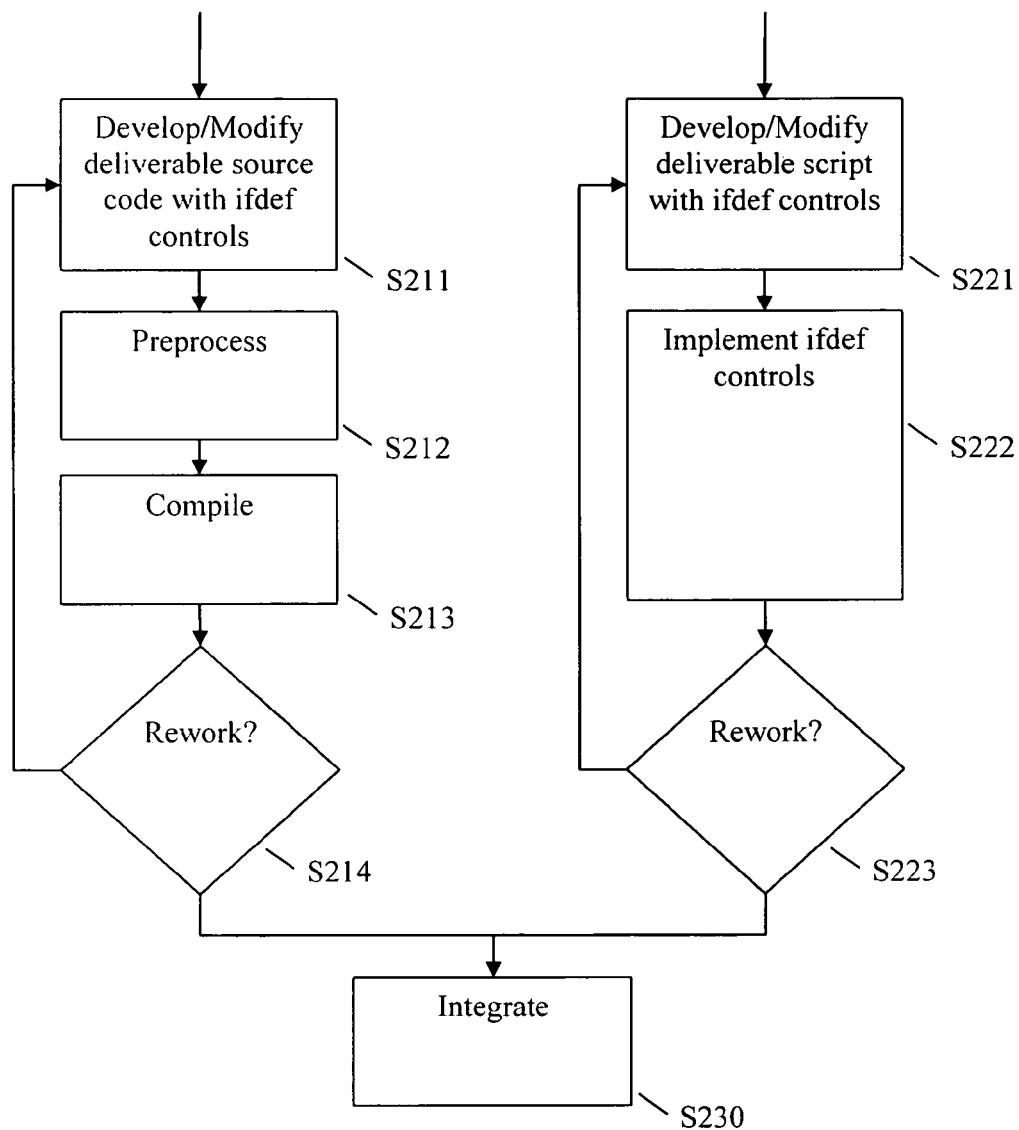
FIG. 2 is a flow chart illustrating a method for maintaining version control in software development according to an embodiment of the present disclosure.

FIG. 2 is a flow chart illustrating a method for maintaining version control in software development according to an embodiment of the present disclosure. Various deliverables may be developed in parallel. For simplicity, FIG. 2 illustrates the development of a single source-code based deliverable and a single script-based deliverable, however it is to be understood that embodiments of the present disclosure may utilize any number of to-be-compiled and not-to-be-compiled deliverables. Deliverable to-be-compiled source code with ifdef controls may be developed/modified (Step S211). In developing the source code deliverable, ifdef controls may be used to indicate which features of the deliverable should be included or excluded from the finished compiled deliverable. After development/modification, the source code may be pre-processed (Step S212). In preprocessing the source code, the ifdef controls may be resolved based on the characteristics of the current build. The preprocessed source code may then be compiled to object code (Step S213). It may then be determined whether the compiled deliverable requires subsequent refinement (Step S214). If the compiled deliverable requires further refinement (Yes, Step S214) then the source code may be refined (Step S211). If the compiled deliverable does not require refinement (No, Step S214) then it may be integrated into the distribution image (Step S230).

Not-to-be-compiled deliverables, for example a script deliverable, may be developed/modified to include ifdef controls (Step S221). In developing the script deliverable, ifdef controls may be used to indicate which features of the deliverable should be included or excluded from the finished ready-to-run deliverable. After development/modification, the ifdef controls may be implemented (Step S222). According to an embodiment of the present disclosure, implementation may be executed by a helper script. According to another embodiment of the present disclosure, implementation may be executed by the same pre-processing tool used to preprocess the source code based deliverable at step S212. In implementing the ifdef controls, the ifdef controls may be resolved based on the characteristics of the current build. It may then be determined whether the ready-to-run script requires subsequent refinement (Step S223). If the ready-to-run script requires further refinement (Yes, Step S223) then the script deliverable may be refined (Step S221). If the ready-to-run script deliverable does not require refinement (No, Step S223) then it may be integrated into the distribution image (Step S230).

FIG. 3 is an example of a simple C program and an accompanying startup script represented in multiple forms to illustrate an embodiment of the present disclosure. An initial version source code deliverable is shown 311. A corresponding startup script that may be used to execute the initial version source code deliverable is also shown 321. To accommodate a new feature, the source code deliverable may be changed. An after-change version of the source code deliverable is shown 312. This version incorporates an arbitrary set of changes that may be indicative of a new feature. An after-change version of the startup script is also shown 322. It should be noted that if the after-change version of the startup script 322 were to be combined with the initial version of the source code deliverable 311 or the initial version of the startup script 321 were combined with the after-change version of the source code deliverable 312, then a broken distribution image would occur.

According to an embodiment of the present disclosure, the new feature added from 311 to 312 and from 321 to 322 can be expressed using ifdef instructions. A source code deliverable with the feature added using ifdef instructions is shown 313. Similarly, a startup script with the added feature is shown 323. Here, the new features of 313 and 323 are characterized as "CHANGE1." The features have been implemented as the "if" portion if the ifdef command while the previous functionality has been retained as the "else" portion of the ifdef command. In this way, the new functionality will be present for a build incorporating CHANGE1 and the old functionality will be present for a build not incorporating CHANGE1. Moreover, this applies both for source code deliverables and non-compiled deliverables, for example script deliverables. Because the features of the deliverables conform to the features of the build, mismatch may be avoided and a working distribution image may be obtained.

Figure 4:
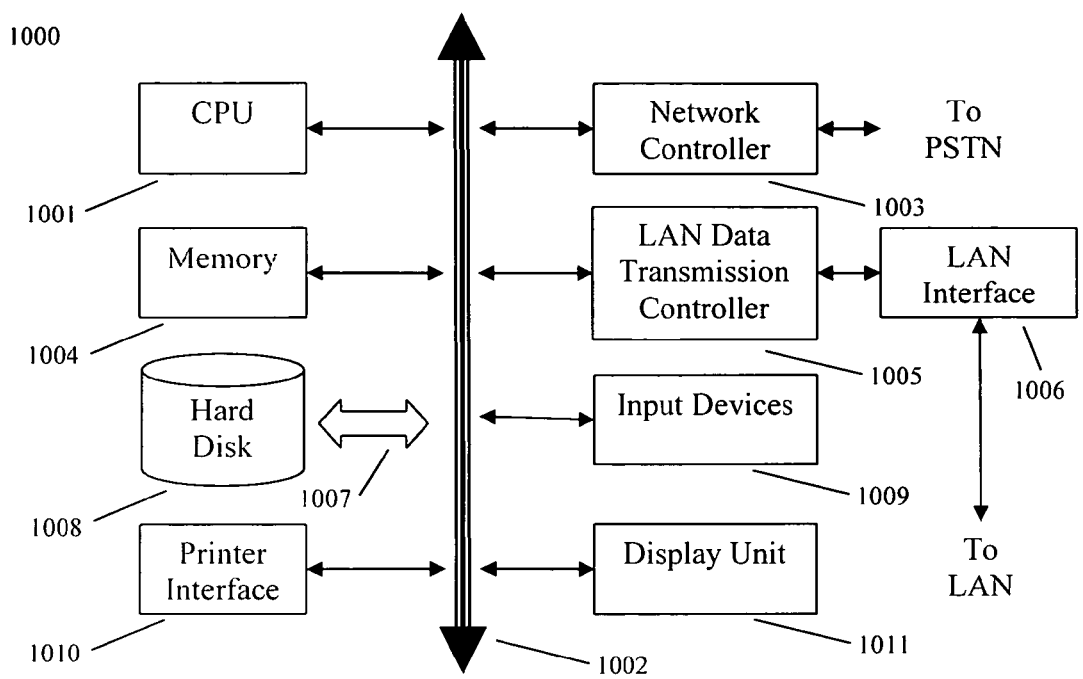
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for constructing a software distribution image, comprising:
   receiving pre-processing instructions for zero or more to-be-compiled components of said software distribution image, the pre-processing instructions operable to delineate modifications for inclusion or exclusion from a final compiled version of said to-be-compiled components;
   receiving pre-processing instructions for one or more not-to-be-compiled components of said software distribution image, said not-to-be-compiled components comprising uncompiled components, the pre-processing instructions operable to delineate modifications for inclusion or exclusion from a final ready-to-run version of said not-to-be-compiled components;

preprocessing each of said zero or more to-be-compiled components to either include or exclude each of said delineated modifications of said to-be-compiled components based on desired characteristics of said software distribution image;

preprocessing each of said one or more uncompiled components to either include or exclude each of said delineated modifications of said uncompiled components based on said desired characteristics of said software distribution image to obtain a ready-to-run version of each of said one or more uncompiled components;

compiling each of said zero or more preprocessed to-be-compiled components to obtain a compiled version of each of said zero or more to-be-compiled components; and assembling each of said ready-to-run version of uncompiled components and each of said zero or more compiled components into said software distribution image, wherein pre-processing each of said one or more uncompiled components comprises using a helper script to resolve, for each modification to the uncompiled components, an instruction, the resolution based on whether a version of a build of a deliverable software product associated with said software distribution image should include each of the modifications to the uncompiled components.

2. The method of claim 1, wherein said pre-processing instructions comprise ifdef instructions.

3. The method of claim 1, wherein one or more of said one or more not-to-be-compiled components are script files.

4. The method of claim 3, wherein one or more of said one or more script files are startup script files for executing one or more of said zero or more to-be-compiled components.

5. The method of claim 1, wherein:
preprocessing each of said one or more uncompiled components comprises determining whether to include or exclude each of said delineated modifications of said uncompiled components based on said desired characteristics of a version of a build of a deliverable software product.

6. The method of claim 1, wherein:
preprocessing each of said zero or more to-be-compiled components comprises determining whether to include or exclude each of said delineated modifications of said to-be-compiled components based on desired characteristics of a version of a build of a deliverable software product associated with said software distribution image, and preprocessing each of said one or more uncompiled components comprises determining whether to include or exclude each of said delineated modifications of said uncompiled components based on said desired characteristics of said version of said build of said deliverable software product.

7. The method of claim 1, wherein said pre-processing instructions for the one or more uncompiled components comprise ifdef instructions.

8. A system for constructing a software distribution image, comprising:
a processor;
an editor for modifying pre-processing instructions for zero or more to-be-compiled components of said software distribution image, the pre-processing instructions operable to delineate modifications for inclusion or exclusion from a final compiled version of said to-be-compiled components;

an editor for modifying pre-processing instructions for one or more not-to-be-compiled components of said software distribution image, said not-to-be-compiled components comprising uncompiled components, the pre-processing instructions operable to delineate modifications for inclusion or exclusion from a final ready-to-run version of said not-to-be-compiled components;

a pre-processing unit for preprocessing each of said zero or more to-be compiled components to either include or exclude each of said delineated modifications of said to-be-compiled components based on desired characteristics of said software distribution image;

a helper script for preprocessing each of said one or more uncompiled components to either include or exclude each of said delineated modifications of said uncompiled components based on said desired characteristics of said software distribution image to obtain a ready-to-run version of each of said one or more uncompiled components, wherein the helper script for preprocessing each of said one or more uncompiled components operates to:
resolve, for each modification to the uncompiled components, an instruction, the resolution based on whether a version of a build of a deliverable software product associated with said software distribution image should include each of the modifications to the uncompiled components;

a compiler for compiling each of said zero or more preprocessed to-be-compiled components to obtain a compiled version of each of said zero or more to-be-compiled components; and a distribution builder for assembling each of said ready-to-run version of uncompiled components and each of said zero or more compiled components into said software distribution image.

9. The system of claim 8, wherein said pre-processing instructions comprise ifdef instructions.

10. The system of claim 8, wherein one or more of said one or more not-to-be-compiled components are script files.

11. The system of claim 10, wherein one or more of said one or more script files are startup script files for executing one or more of said zero or more to-be-compiled components.

12. The system of claim 8 wherein said pre-processing unit is a unifdef tool.

13. The system of claim 8 wherein said pre-processing unit is part of the compiler.

14. The system of claim 8 wherein said helper script is a unifdef tool.

15. The system of claim 8 wherein said editor for modifying zero or more to-be-compiled components and said editor for modifying one or more not-to-be-compiled components are text file editors.

16. The system of claim 8 wherein said editor for modifying zero or more to-be-compiled components and said editor for modifying one or more not-to-be-compiled components are the same editor.

17. The system of claim 8, wherein:
the helper script for preprocessing each of said one or more uncompiled components determines whether to include or exclude each of said delineated modifications of said uncompiled components based on said desired characteristics of a version of a build of a deliverable software product.

18. The system of claim 8, wherein:
the pre-processing unit for preprocessing each of said zero or more to-be-compiled components determines whether to include or exclude each of said delineated modifications of said to-be-compiled components based on desired characteristics of a version of a build of a deliverable software product associated with said software distribution image, and
the helper script for preprocessing each of said one or more uncompiled components determines whether to include or exclude each of said delineated modifications of said uncompiled components based on said desired characteristics of said version of said build of said deliverable software product.

19. The system of claim 8, wherein said pre-processing instructions for the one or more uncompiled components comprise ifdef instructions.

20. A computer system comprising:
a processor; and
a computer recording medium including computer executable code executable by the processor for constructing a software distribution image, the computer executable code comprising:
code for receiving pre-processing instructions for zero or more to-be-compiled components of said software distribution image, the pre-processing instructions operable to delineate modifications for inclusion or exclusion from a final compiled version of said to-be-compiled components;
code for receiving pre-processing instructions for one or more not-to-be-compiled components of said software distribution image, said not-to-be-compiled components comprising uncompiled components, the pre-processing instructions operable to delineate modifications for inclusion or exclusion from a final ready-to-run version of said not-to-be-compiled components;
code for preprocessing each of said zero or more to-be-compiled components to either include or exclude each of said delineated modifications of said to-be-compiled components based on desired characteristics of said software distribution image;
code for preprocessing each of said one or more uncompiled components to either include or exclude each of said delineated modifications of said uncompiled components based on said desired characteristics of said software distribution image to obtain a ready-to-run version of each of said one or more uncompiled components;
code for compiling each of said zero or more preprocessed to-be-compiled components to obtain a compiled version of each of said zero or more to-be-compiled components; and
code for assembling each of said ready-to-run version of uncompiled components and each of said zero or more compiled components into said software distribution image,
wherein the code for preprocessing each of said one or more uncompiled components comprises code for resolving, for each modification to the uncompiled components, an instruction, the resolution based on whether a version of a build of a deliverable software product associated with said software distribution image should include each of the modifications to the uncompiled components.

21. The computer system of claim 20, wherein said pre-processing instructions comprised ifdef instructions.

22. The computer system of claim 20, wherein one or more of said one or more not-to-be-compiled components are script files.

23. The computer system of claim 22, wherein one or more of said one or more script files are startup script files for executing one or more of said zero or more to-be-compiled components.

24. The computer system of claim 20, wherein:
the code for preprocessing each of said one or more uncompiled components comprises code for determining whether to include or exclude each of said delineated modifications of said uncompiled components based on said desired characteristics of a version of a build of a deliverable software product.

25. The computer system of claim 20, wherein:
the code for preprocessing each of said zero or more to-be-compiled components comprises code for determining whether to include or exclude each of said delineated modifications of said to-be-compiled components based on desired characteristics of a version of a build of a deliverable software product associated with said software distribution image, and
the code for preprocessing each of said one or more uncompiled components comprises code for determining whether to include or exclude each of said delineated modifications of said uncompiled components based on said desired characteristics of said version of said build of said deliverable software product.

26. The computer system of claim 20, wherein said pre-processing instructions for the one or more uncompiled components comprise ifdef instructions.

27. A computer program storage device including computer executable code for constructing a software distribution image, the computer executable code comprising:
code for receiving pre-processing instructions for zero or more to-be-compiled components of said software distribution image, the pre-processing instructions operable to delineate modifications for inclusion or exclusion from a final compiled version of said to-be-compiled components;
code for receiving pre-processing instructions for one or more not-to-be-compiled components of said software distribution image, said not-to-be-compiled components comprising uncompiled components, the pre-processing instructions operable to delineate modifications for inclusion or exclusion from a final ready-to-run version of said not-to-be-compiled components;
code for preprocessing each of said zero or more to-be-compiled components to either include or exclude each of said delineated modifications of said to-be-compiled components based on desired characteristics of said software distribution image;
code for preprocessing each of said one or more uncompiled components to either include or exclude each of said delineated modifications of said uncompiled components based on said desired characteristics of said software distribution image to obtain a ready-to-run version of each of said one or more uncompiled components;
code for compiling each of said zero or more preprocessed to-be-compiled components to obtain a compiled version of each of said zero or more to-be-compiled components; and
code for assembling each of said ready-to-run version of uncompiled components and each of said zero or more compiled components into said software distribution image, wherein the code for preprocessing each of said one or more uncompiled components comprises code for resolving, for each modification to the uncompiled components, an instruction, the resolution based on whether a version of a build of a deliverable software product associated with said software distribution image should include each of the modifications to the uncompiled components.

28. The computer program storage device of claim 27, wherein said pre-processing instructions comprise ifdef instructions.

29. The computer program storage device of claim 27, wherein one or more of said one of more not-to-be-compiled components are script files.

30. The computer program storage device of claim 29, wherein one or more of said one or more script files are startup script files for executing one or more of said zero or more not-to-be-compiled components.

31. The computer program storage device of claim 27, wherein:
the code for preprocessing each of said one or more uncompiled components comprises code for determining whether to include or exclude each of said delineated modifications of said uncompiled components based on said desired characteristics of a version of a build of a deliverable software product.

32. The computer program storage device of claim 27, wherein:
the code for preprocessing each of said zero or more to-be-compiled components comprises code for determining whether to include or exclude each of said delineated modifications of said to-be-compiled components based on desired characteristics of a version of a build of a deliverable software product associated with said software distribution image, and
the code for preprocessing each of said one or more uncompiled components comprises code for determining whether to include or exclude each of said delineated modifications of said uncompiled components based on said desired characteristics of said version of said build of said deliverable software product.

33. The computer program storage device of claim 27, wherein said pre-processing instructions for the one or more uncompiled components comprise ifdef instructions.

* * * * *